United States Patent [19]

Sato

[11] Patent Number: 5,166,897
[45] Date of Patent: Nov. 24, 1992

[54] INTEGRAL CALCULATING APPARATUS
[75] Inventor: Hiroshi Sato, Fussa, Japan
[73] Assignee: Casio Computer Co., Ltd., Tokyo, Japan
[21] Appl. No.: 593,781
[22] Filed: Oct. 5, 1990
[30] Foreign Application Priority Data
  Oct. 25, 1989 [JP] Japan .................. 1-124656[U]
[51] Int. Cl.⁵ ........................................ G06F 15/31
[52] U.S. Cl. ........................ 364/733; 364/709.01
[58] Field of Search ........ 364/733, 605, 829, 709.01, 364/710.01

[56] References Cited
U.S. PATENT DOCUMENTS

| | | | |
|---|---|---|---|
| 3,767,899 | 10/1973 | Barter | 364/733 |
| 3,784,789 | 1/1974 | Broek | 364/829 |
| 4,180,857 | 12/1979 | Yoshihara et al. | 364/497 |
| 4,365,303 | 12/1982 | Hannah et al. | 364/498 |
| 4,398,263 | 8/1983 | Ito | 364/733 |
| 4,794,553 | 12/1988 | Watanabe | 364/710.01 |
| 4,794,554 | 12/1988 | Tamiya | 364/710.01 |

*Primary Examiner*—David H. Malzahn
*Attorney, Agent, or Firm*—Frishauf, Holtz, Goodman & Woodward

[57] ABSTRACT

An integral calculating apparatus inputs arbitrary curve data by operating keys and the like so as to display the inputted curve data, and also designates a predetermined range with respect to the inputted curve data in order to perform a definite integral calculation with respect to the inputted curve data.

10 Claims, 4 Drawing Sheets

INTEGRAL CALCULATING APPARATUS

BACKGROUND OF THE INVENTION

1. Field of the Invention

The present invention relates to an integral calculating apparatus for plotting a plurality of data and for performing a definite integral calculation based upon a curve obtained from the plotted data.

2. Description of the Related Art

Various compact electronic calculators having an integration function have been practically used. One of these compact electronic calculators is known from, for instance, U.S. Pat. No. 4,398,263 entitled "CALCULATOR HAVING INTEGRATING FUNCTION", issued on Aug. 9, 1983 to Ito, assigned to Casio Computer Co., Ltd.

As an integration function employed in such compact electronic calculators, a function formula is inputted and a definite integral is calculated with respect to this inputted function formula.

However, the above-described conventional compact electronic calculators have the following problem that no integral value can be obtained with respect to such data that a function formula is not previously known, for example, data on experiments, a function formula of which is not previously known.

SUMMARY OF THE INVENTION

The present invention has been made in an attempt to solve the above-described problem, and therefore has an object to provide an integral calculating apparatus capable of readily obtaining an integral value with respect to an arbitrary curve made from data on experiments and the like.

To achieve the above-described object, an integral calculating apparatus, according to the present invention, comprises:

data input means for manually inputting curve data based on an X-Y coordinate;

interval designating means for designating an interval of the curve data inputted by said data input means; and, calculating means for performing a calculation of integral based on the curve data inputted by said data input means and the interval of the curve data designated by said interval designating means, and for obtaining a value of definite integral of the curve data input by said data input means with respect to the X-Y coordinate.

Since the compact electronic calculator with the above-described arrangement according to the present invention, can easily obtain an integral value for an arbitrary curve based upon data on experiments and the like, there is a particular advantage that utilization of this compact electronic calculator can be furthermore expanded.

BRIEF DESCRIPTION OF THE DRAWINGS

The above-described object and other features of the present invention will be readily understood by reading the description with reference to the accompanying drawings, in which.

DETAILED DESCRIPTION OF THE PREFERRED EMBODIMENTS

Arrangement of Integral Calculating Apparatus

Figure 1:
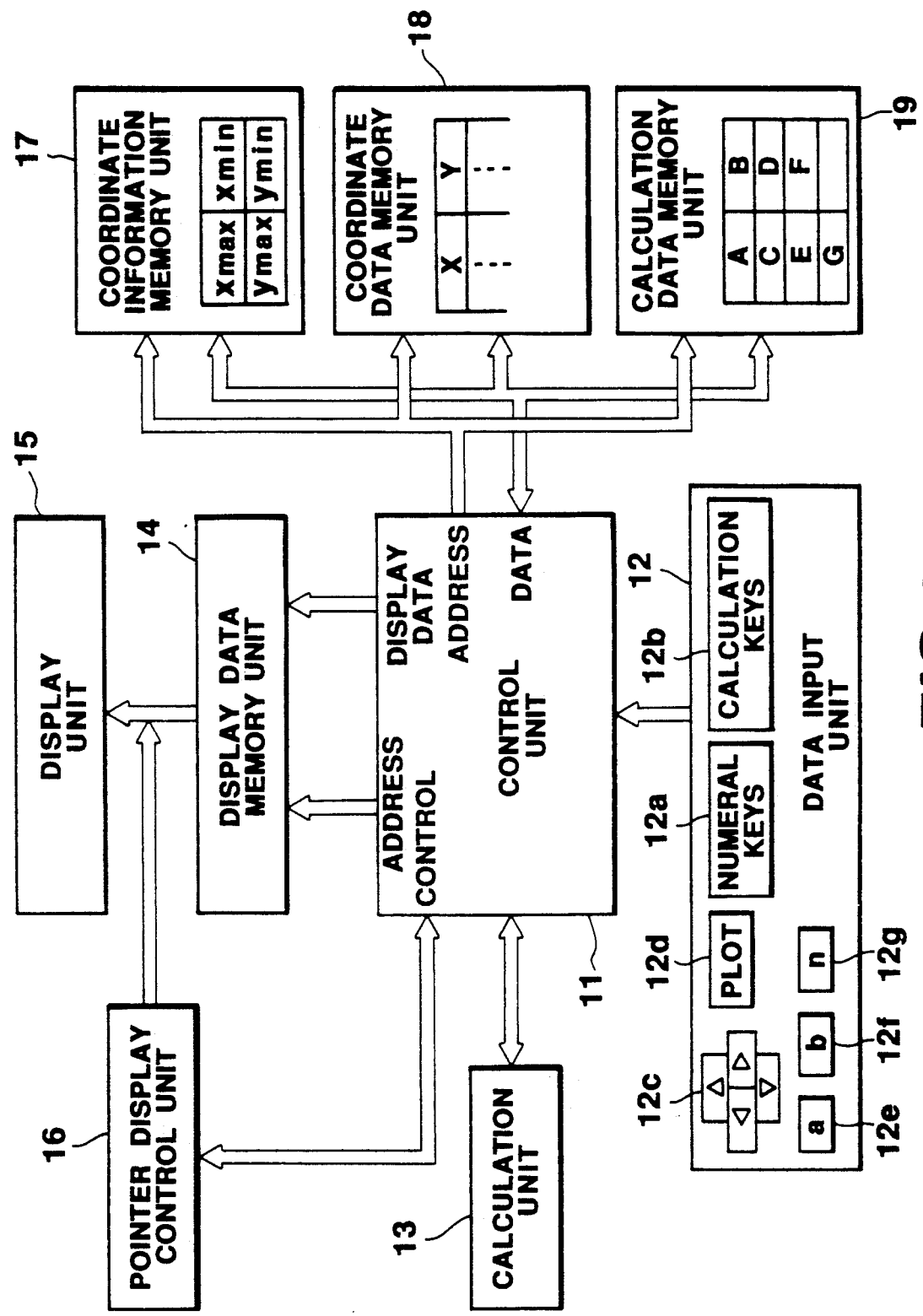
FIG. 1 is a circuit block diagram for representing a circuit arrangement of an integral calculating apparatus according to a preferred embodiment of the present invention.

In FIG. 1, there is shown an arrangement of an electronic circuit for an integral calculating apparatus according to a first preferred embodiment of the present invention. In the first integral calculating apparatus shown in FIG. 1, a control unit 11 is employed so as to control operations of various circuit portions thereof in response to input signals of various data supplied from a data input unit 12, and also performs a calculation process by a calculation unit 13.

A display unit 15 is connected to this control unit 11, by which either mathematical calculations or curve data may be displayed via a display data memory unit 14. A pointer display control unit 16 for controlling a display position of a pointer (cursor) 15a on a display screen of this display unit 15, is connected between the control unit 11 and display unit 15.

Figure 2A:
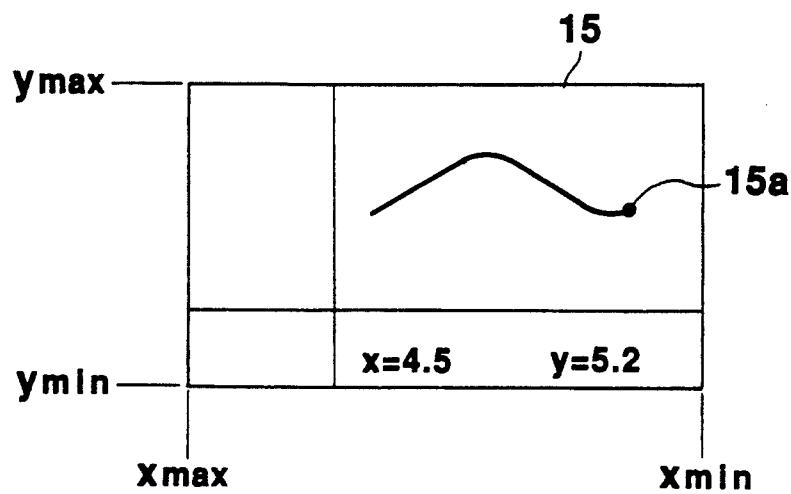
FIGS. 2A and 2B are representations of curve data at the display unit of the integral calculating apparatus shown in FIG. 1.

The above-described display unit 15 is constructed of liquid crystal display elements having 96 ×64 dots in horizontal and vertical directions. Based on coordinate data inputted by the data input unit 12, both curve data and coordinate values of the pointer (cursor) 15a may be displayed, as represented in FIG. 2A by this display unit 15.

On the other hand, the above-explained data input unit 12 includes numeral entry keys 12a; calculation keys 12b; a cursor key 12c and the like; and also a plot key 12d for inputting coordinate data in response to the pointer 15a, the display position of which is controlled by the cursor key 12c on the display unit 15; an key 12e for designating a range of a definite integral; a key 12f for designating a range of a definite integral; and, an key 12g for designating an integral split number (will be discussed in detail).

From the data input unit 12, coordinate data $x_{min}$, $x_{max}$, $y_{min}$ and $y_{max}$ are inputted which define a display range on the display unit 15 when the curve data is displayed. These coordinate data are inputted via the control unit 11 to a coordinate information memory unit 17.

Now, with respect to a display position coordinate (X,Y) of a dot on the display unit 15, actual coordinate data (x,y) will be obtained by the control unit 11 with employment of the data stored in the coordinate information memory unit 17:

$$x = X \times \{(x_{max} - x_{min})/(96-1)\} + x_{min} \quad (1)$$

$$y = Y \times \{(y_{max} - y_{min})/(64-1)\} + y_{min} \quad (2).$$

The coordinate display position (X,Y) of the respective dots for the curve data displayed on the display unit 15 in response to the key operation in the data input unit 12 is inputted via the control unit 11 into a coordinate data memory unit 18 so as to be stored therein.

Furthermore, a calculation data memory unit 19 is connected to the control unit 11, which employs registers "A" to "E" for storing data which have been acquired while performing definite integral calculations on the curve data displayed on the display unit 15.

Figure 3:
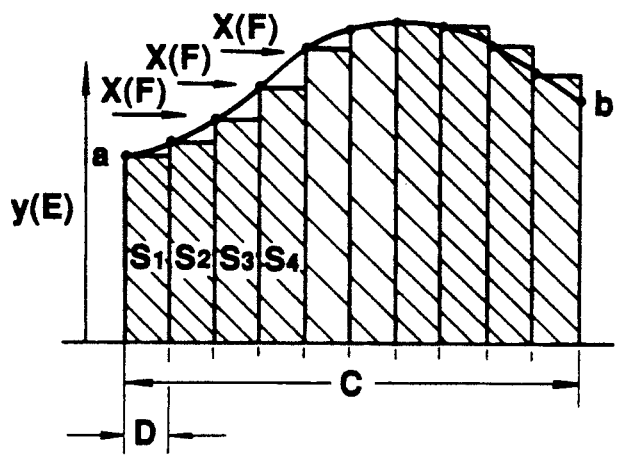
FIG. 3 is a representation for showing a split condition when a definite integral is calculated based upon inputted curve data in the integral calculating apparatus shown in FIG. 1.

To the register A employed in the calculation data memory unit 19, pointer coordinate data corresponding to an integral starting point "A" of the curve data is stored. Pointer coordinate data corresponding to an integral ending point "B" of the curve data is stored into the register B. As represented in FIG. 3, split number data with respect to a definite integral range A to B is stored into the register C. Furthermore, data "(B−A)/C" corresponding to a split width of the curve data is stored into the register D. To the register E, a value of a y-direction in each split portion is stored into the register E. A value of an X-direction in each split portion is stored into the register F. Then, a definite integral value for summing x-y regions in the respective split portions is stored into the register G.

Integral Calculation By First Integral Calculating Apparatus

A description will now be made of an integral calculation by the above-described integral calculating apparatus according to the first preferred embodiment of the present invention.

Figure 4:
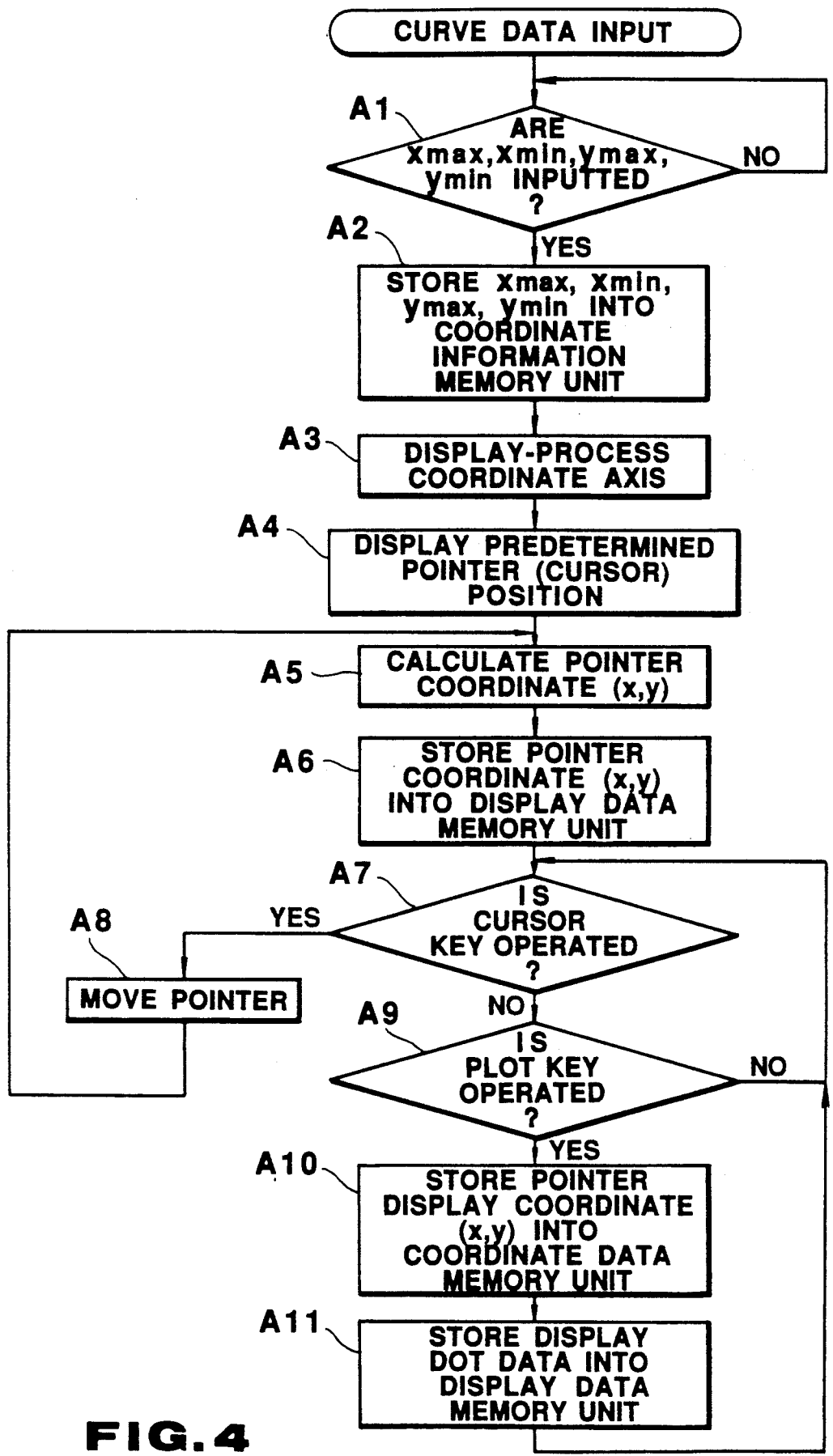
FIG. 4 is a flowchart for explaining a process for inputted curve data performed in the integral calculating apparatus shown in FIG. 1; and, FIG. 5 is a flowchart for explaining a definite integral process for inputted curve data performed in the integral calculating apparatus shown in FIG. 1.

First, a process for inputted curve data will now be described with reference to a flowchart shown in FIG. 4.

In case that the curve data is inputted, the coordinate data of $x_{min}$, $x_{max}$, $y_{min}$ and $y_{max}$ are inputted by operating the numeral entry key 12a of the data input unit 12 (a step A1). These inputted coordinate data $x_{min}$, $x_{max}$, $y_{min}$ and $y_{max}$ are stored via the control unit 11 into the coordinate information memory unit 17 (a step A2).

Then, the control unit 11 forms coordinate axis data (i.e., X-axis data and Y-axis data) based upon the above-described data $x_{min}$, $x_{max}$, $y_{min}$ and $y_{max}$, stores these coordinate axis data into the display data memory unit 14, and also displays the coordinate axes on the display unit 15 (a step A3). Also the control unit 11 controls the pointer display control unit 16 to display the pointer (cursor) 15a at a step A4, and further calculates coordinate points corresponding to the display position of the pointer 15a on the display unit 15 (steps A5 and A6).

Here, an operator manipulates the cursor key 12c to move the pointer 15a and operates the plot key 12d at a desired position in order to sequentially input curve data (steps A7 to A9). In this case, the above-described curve data may be alternatively performed in such a manner that the coordinate data (x,y) is entered by the numeral entry key 12a.

On the other hand, the control unit 11 writes display dot data into the display data memory unit 14 in response to the key operation by the data input unit 12, and sequentially stores each of the coordinate data (X,Y) into the coordinate data memory unit 18 (steps A10 and A11).

Integral Calculation By First Integral Calculating Apparatus

Figure 5:
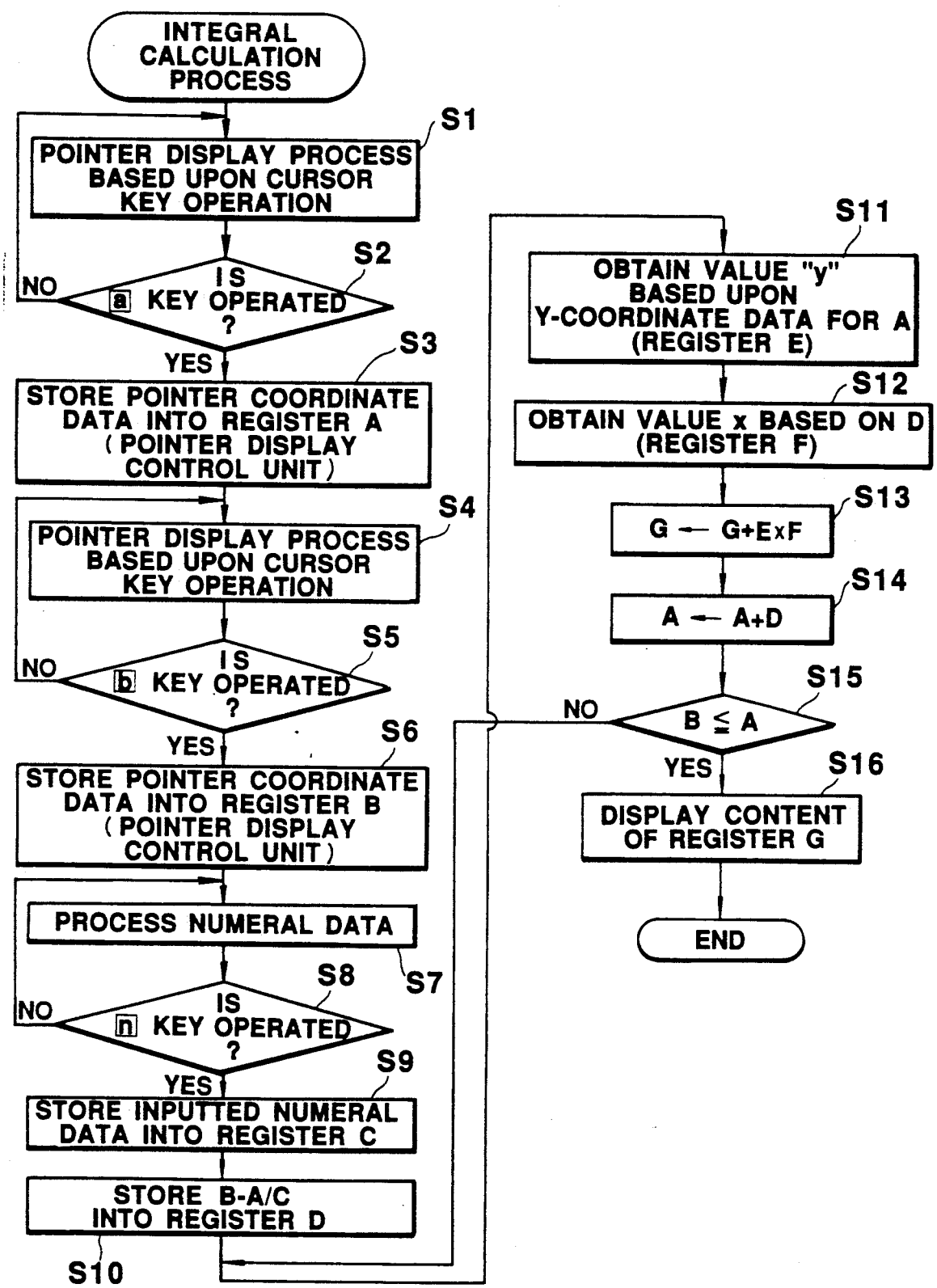

Referring now to a flowchart shown in FIG. 5, an integral calculation process with respect to the curve data which has been inputted into the first integral calculating apparatus, as described above will be described.

Figure 2B:
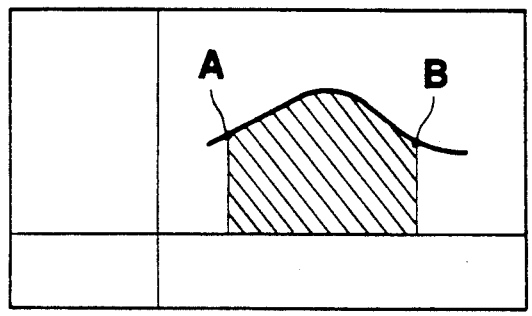

At a first, to set a definite integral range A to B (refer to FIG. 2B) for the inputted curve data, the cursor key 12c employed in the data input unit 12 is operated so as to move the pointer 15a displayed on the display unit 15. The key 15e and key 15f are operated at the desired positions ("A" and "B" shown in FIG. 2B).

In accordance with the above-described key operations, both the pointer coordinate data corresponding to the integral starting point "A" and the pointer coordinate data corresponding to the integral end point "B" are read out from the pointer display control unit 16, and then are stored via the control unit 11 into the registers A and B employed in the calculation data memory unit 19 (steps S1 to S6). Thereafter, the numeral entry keys 12a and "n" key 12g of the data input unit 12 are operated in order to input the split number (see FIG. 3) with respect to the above-described integral range A to B. Then, this split number is stored via the control unit 11 into the register C of the calculation data memory unit 19 (steps S7 to S9). At this time, the dot number of the split width "(B−A)/C" corresponding to the split width of the curve data is calculated and the resulting dot number data is stored into the register D employed in the calculation data memory unit 19 (step S10).

Under such circumstances, the integral starting point which has been stored into the register A, namely the Y-coordinate data on the first split unit is read out from the coordinate data memory unit 18, and an actual value "y" thereof is obtained based upon the above-described formula (2) and the resultant data is stored into the register E (a step S11). Subsequently, one split width of the curve data which has been stored in the register D at the above-described step S10 is read out, and an actual value "x" thereof is calculated based upon the above-mentioned formula (1) and the resultant data is stored into the register F (a step S12).

In other words, both the y value and x value in the first split portion are obtained at the steps S11 and 12. When the contents of the registers E and F into which these y value and x value have been stored are multiplied with each other, whereby an area "S1" of the first split portion is obtained and the resultant value (area "S1") is stored into the register G (G←G+E F) (a step S13).

Thus, when the area S1 with respect to the first split portion of the curve data has been obtained, the integral starting point on the curve data which has been stored into the register A is advanced by the split width which has been stored into the register D, which represents Y-coordinate data on a second split portion (A←A+D) (a step S14). At this time, a judgement is made whether or not the point on the curve indicated by the register A has reached to the above-described integral end point B (a step S15).

In this case, since a value of the register A represents the Y-coordinate data on the second split portion and has not yet reached the above-explained integral end point B, a judgement result is made "NO" at the steps S15 and the process is returned to the process defined from the previous step S11.

Thus, the point on the curve which has been stored into register A, namely the Y-coordinate data on the second split unit is read out from the coordinate data memory unit 18, a value "y" thereof is calculated based upon the above formula (2), and the resultant data is stored into the register E (the step S11). Then, one split width of the curve data which has been stored into the register D at the previous step S10 is read out, a value "x" thereof is obtained based upon the above formula (1), and thus the resultant data is stored into the register F (the step S12).

That is, both the y value are x value for the second split portion are obtained at these steps S11 and S12. Since the contents of the registers E and F into which these x value and y value have been stored are multiplied with each other, in order to obtain an area "S2" of this second split portion, this area S2 is added to the previously calculated area S1 of the first split portion and the resultant value is stored into the register G ($G \leftarrow G+E F$)( a step S13).

In other words, since the judgement and process as defined at the step S11 to S15 are repeated, the areas Si ($i=1,2,3, \text{---} n$) at the respective split portions within the integral range A to B of the curve data are obtained and the summation thereof is stored into the register G.

Now, if the judgement result is made "YES" at the step S15, namely if judgement is made that the point on the curve indicated by the register A has reached the integral end point B, the content of the register G employed in the calculation data memory unit 19, that is say, the summation $S1+S2+S3 \text{---} Sn$ of the area "Si" for the respective split portions within the integral range A to B of the curve data is outputted as the definite integral value from the control unit 11 via the display data memory unit 14 to the display unit 15 for the display purpose (a step S16).

Accordingly, in accordance with the first integral calculating apparatus having the above-described arrangement, an arbitrary integral range may be set for arbitrary curve data and a definite integral value thereof may be readily obtained.

It should be noted that although the curve data was inputted by operating the cursor key or the like in the above-described first preferred embodiment, this curve data may be alternatively inputted by manipulating a tablet.

What is claimed is:

1. A data processing apparatus comprising:
   manual data input means for inputting curve data based on an X-Y coordinate;
   interval designating means for designating an interval of the curve data manually inputted through said data input means;
   split number input means for inputting a split number to split said interval of the curve data;
   first calculating means for performing a calculation of integral based on the curve data manually inputted through said data input means every interval split by the split number input from said split number input means and for obtaining a value of the definite integration of the curve data with respect to each interval split by the split number; and
   second calculating means for adding each value of the definite integral of the curve data with respect to each interval split by the split number, which are obtained by said first calculating means.

2. The data processing apparatus of claim 1, further comprising:
   display means for displaying the curve data manually inputted by said data input means.

3. The data processing apparatus of claim 2, wherein said data input means includes coordinate data designating means for designating coordinate data with respect to a coordinate system of said display means;
   said calculating means includes converting means for converting the coordinate data designated by said coordinate data designating means into a value of a coordinate system with respect to the X-Y coordinate; and,
   said display means includes means for displaying the curve data in response to the coordinate data designated by said coordinate data designating means.

4. The data processing apparatus of claim 3, further comprising:
   memory means for storing the coordinate data designated by said coordinate data designating means.

5. The data processing apparatus of claim 3, wherein said interval designating means includes limit data designating means for designating two limits of the interval of the curve data displayed on said display means.

6. The data processing apparatus of claim 5, wherein said limit data designating means includes means for designating coordinate data corresponding to the limits of the interval of the curve data displayed on said display means; and,
   said calculating means includes means for converting the coordinate data designated by said limit data designating means into a value of a coordinate system with respect to the X-Y coordinate.

7. The data processing apparatus of claim 1, wherein said manual data input means comprises numeral keys.

8. The data processing apparatus of claim 1, wherein said manual data input means comprises cursor keys.

9. The date processing apparatus of claim 1, wherein said manual data input means comprises an input tablet.

10. A data processing apparatus comprising:
    data input means for inputting curve data based on an X-Y coordinate;
    interval designating means for designating an interval of the curve data inputted by said data input means;
    split number input means for inputting a split number to split said interval; and
    calculating means for performing a calculation of integral based on the curve data inputted by said data input means and the interval of the curve data designated by said interval designating means, and for obtaining a value of a definite integral of the curve data inputted by said data input means with respect to the X-Y coordinate, said calculating means including:
    first means for performing the calculation of integral based on the curve data inputted by said data input means every interval spit by the split number inputted from said split number input means to obtain the value of the definite integration of the curve data with respect to each interval spilt by the spit number; and
    second means for adding each value of the definite integral of the curve data with respect to each interval split by the split number, which are obtained by said first means.

* * * * *